United States Patent [19]

Hoene

[11] Patent Number: 5,779,415

[45] Date of Patent: Jul. 14, 1998

[54] SLEEVE FOR GUIDING, DEFLECTING AND HOLDING A NAIL AND PROCESS FOR PRODUCING THIS SLEEVE

[76] Inventor: Jochen Hoene, Südring 11, 51702 Bergneustadt, Germany

[21] Appl. No.: 757,400

[22] Filed: Nov. 27, 1996

[30] Foreign Application Priority Data

Nov. 28, 1995 [DE] Germany ................. 195 44 184.2
Jan. 13, 1996 [DE] Germany ................. 196 01 091.8

[51] Int. Cl.$^6$ ............................................. F16B 15/00
[52] U.S. Cl. ........................... 411/358; 411/477; 411/45
[58] Field of Search ................. 411/358–359, 477–479, 411/448, 449, 45, 922

[56] References Cited

U.S. PATENT DOCUMENTS

| | | | |
|---|---|---|---|
| 1,548,456 | 8/1925 | Goodman | 411/359 |
| 3,188,904 | 6/1965 | Owen | 411/358 |
| 4,012,913 | 3/1977 | Scott | 411/479 |
| 4,456,416 | 6/1984 | Schlein | 411/358 |
| 4,611,964 | 9/1986 | Schlein | 411/358 |

FOREIGN PATENT DOCUMENTS

| | | | |
|---|---|---|---|
| 116125 | 11/1942 | Australia | 411/479 |
| 75727 | 5/1892 | Germany | 411/358 |

*Primary Examiner*—Flemming Saether
*Attorney, Agent, or Firm*—Sixbey, Friedman, Leedom & Ferguson; David S. Safran

[57] ABSTRACT

A sleeve (1) for guiding, deflecting and holding nail (2), having a sleeve body (3), a deflection opening (4) in sleeve body (3) and a guide (5) which extends into the deflection opening (4), and a process for producing such a sleeve (1). To simplify the production process and to reduce production costs of sleeve (1), it is provided, according to preferred embodiments of the invention, that the sleeve body (3) is formed of a rolled section of a flat material, preferably, a rolled sheet-metal strip.

18 Claims, 2 Drawing Sheets

5,779,415

1

SLEEVE FOR GUIDING, DEFLECTING AND HOLDING A NAIL AND PROCESS FOR PRODUCING THIS SLEEVE

BACKGROUND OF THE INVENTION

1. Field of the Invention

The invention relates to a sleeve for guiding, deflecting and holding a nail in a wall. In particular, to such a sleeve having a sleeve body, a deflection opening in the sleeve body and a guide which passes into the deflection opening. The invention also relates to a process for producing such a sleeve.

2. Description of Related Art

A sleeve for guiding, deflecting and holding a nail of the general type mentioned initially is already known. These sleeves are used in conjunction with nails for attachment, especially in the building trade. These nail-sleeve connections are used, mainly, in "soft" building block materials to allow driving of a nail as a replacement for expansion anchors of the screw-plug type. First, a hole is drilled in a block, and then, the sleeve is inserted into the hole for this attachment with a nail. Then, a nail is driven into the sleeve. When the nail is driven in it is routed laterally out of the sleeve body via the guide and the deflection opening and at the same time bent in an arc shape. The bent part of the nail projects out of the sleeve body and is thus buried in the block. This yields a secure attachment which can be produced much more quickly compared to a screw attachment via a dowel.

Known sleeves for guiding, deflecting and holding a nail are produced from a tube. For this purpose, suitable tube sections are cut off of the tube. Then, to produce the deflection opening and the guide, a tongue is punched out into each tube section. Moreover, to produce an edged sleeve head, one end of the tube section is widened with a separate tool. On its other end, the sleeve is conventionally provided with a chamfered sleeve end. The chamfering must be produced by turning in another separate production process. The disadvantage of the known sleeve is that the tube material is comparatively expensive and the entire production process, i.e., punching to produce the deflection opening and the guide, widening of one sleeve end to produce the edged sleeve head, and turning the other sleeve end to produce a chamfer, is comparatively expensive.

Furthermore, U.S. Pat. No. 3,945,414 discloses a means for guiding, deflecting and holding a nail. It is a manual device which, in contrast to the aforementioned sleeve, is not driven in. The device is otherwise composed of a plurality of parts.

SUMMARY OF THE INVENTION

In view of the foregoing, it is a primary object of the present invention to provide a sleeve for guiding, deflecting and holding a nail in a wall and a process for producing such a sleeve which avoid the aforementioned disadvantages of the prior art.

The invention achieves this object by taking a new approach. In particular, according to the invention, a sleeve for guiding, deflecting and holding a nail it is provided in which the sleeve body is formed of a rolled flat material section or is produced from one. In contrast to the prior art, therefore, tube material is no longer used for the base material for the sleeve, and instead, flat material is rolled to produce the sleeve body. This rolled material is much more economical than tube material. Of course especially sheet-

2 metal strip which could be, for example, "C 67 soft" material is suitable as the rolled material. But, naturally, another material, such as plastic, can also be used.

The invention proceeds from the idea that, with respect to its base material and due to the various different working processes, the known sleeve is comparatively expensive. Compared to the tube material, flat material which can be unwound from a coil, cut off and then rolled to produce the sleeve is not only much more economical, but the individual working processes for producing the sleeve head and the chamfered sleeve end can be greatly simplified, specifically likewise by rolling processes. In any case, total production costs and total labor input are considerably reduced by a sleeve rolled according to the invention.

The sleeve body can be most easily and cost-favorably produced by using an originally rectangular flat material section in which a tongue-shaped slot is formed, the slot running roughly in the longitudinal direction of the sleeve body. Of course, it goes without saying that the sleeve body can also be rolled such that the slot runs helically.

In addition, the use of rolled flat material makes it possible to easily produce sleeve bodies with different diameters. The different diameters of the sleeve body can be produced using a single section of flat material by overlapping the longitudinal edges (smaller diameter), abutting them (medium diameter) or spacing the longitudinal edges of the sleeve body apart larger diameter). Conversely, it is necessary in the prior art to make available a specific tube for each specific nail diameter.

To better guide the nail as is it being driven, there is at least one, preferably peripheral, constriction in the sleeve body. The constriction is preferably bevelled in the nail insertion or driving direction, the height of the constriction being selected such that, during insertion, the nail tip does not strike the front free edge of the guide which projects into the sleeve body. The constriction, therefore, ensures that the nail tip is guided onto the guide, in any case, so that the desired defection and emergence of the nail from the deflection opening are achieved.

In one preferred embodiment of this invention, the free inside diameter in the area of the constriction is less than the outside diameter of the nail. This ensures that a clamping action is exerted on the nail; this greatly facilitates premounting and also handling of the sleeve according to the invention. In this way, it is possible to ensure that even with a vertical arrangement of the sleeve, an inserted nail does not fall out of the sleeve. Moreover, if there are two constrictions spaced from one another in the longitudinal direction, this not only improves the clamping action, but also ensures outstanding guidance, i.e., an accurately set guided arrangement of the nail in the sleeve.

Additionally, it is especially advantageous if the sleeve and the nail form a premounted construction unit. This means that the nail is already inserted into the sleeve, being delivered premounted by the manufacturer. This ensures, first of all, that the "correct" nail is always delivered, and moreover, that there is essentially one nail for each sleeve. It often happens at construction sites that there are sleeves, but no nails, and later it is forgotten to drive a nail into the inserted sleeves.

Although the constriction could also be accomplished via separate part which is inserted into the sleeve body after rolling, it is a good idea if the constriction is rolled into the flat material section before or during rolling of the sleeve body. This can be done quickly, easily and economically.

In addition, before, during or after rolling the sleeve body, an edged sleeve head and/or a chamfered sleeve end can be formed on the flat material section or on the sleeve body, likewise by the corresponding rolling processes. Other tools as in the prior art are not necessary here.

Finally, after producing the sleeve body, the guide forming the deflection opening can be easily inserted into it, especially by punching a tongue out of the sleeve body and bending it into the interior of the sleeve body.

Other features, advantages and possible applications of this invention follow from the following description together with the accompanying drawings.

DETAILED DESCRIPTION OF THE PREFERRED EMBODIMENTS

Figure 1:
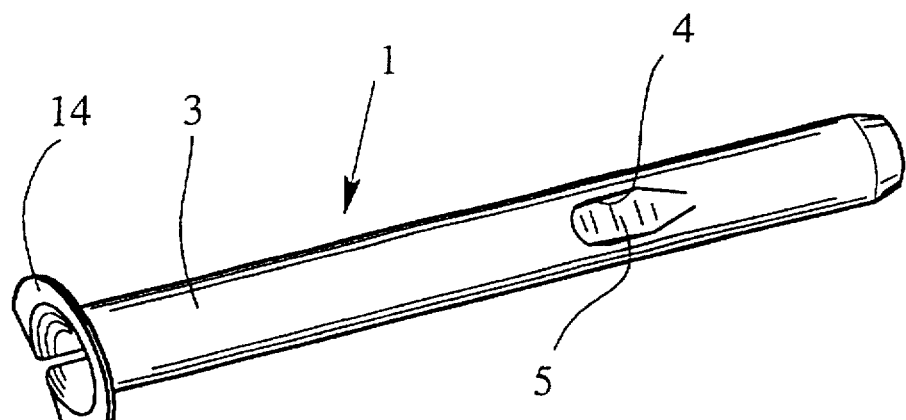
FIG. 1 is a perspective view of a sleeve according to the invention.
Figure 2:
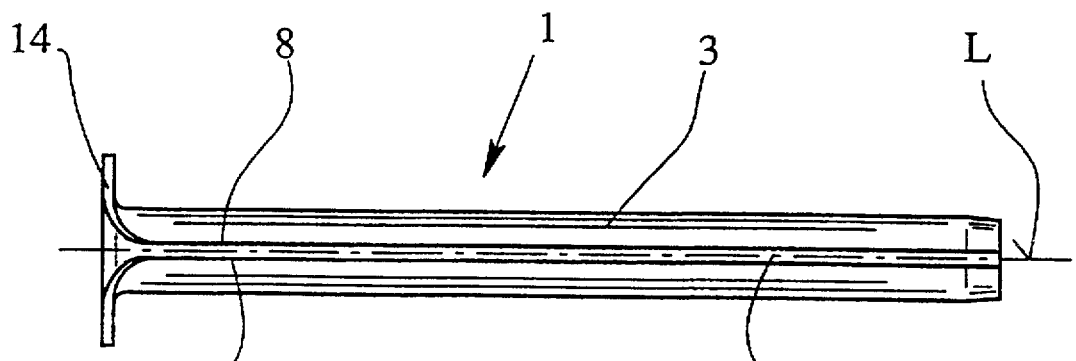
FIG. 2 is a side view of the sleeve from FIG. 1.
Figure 3:
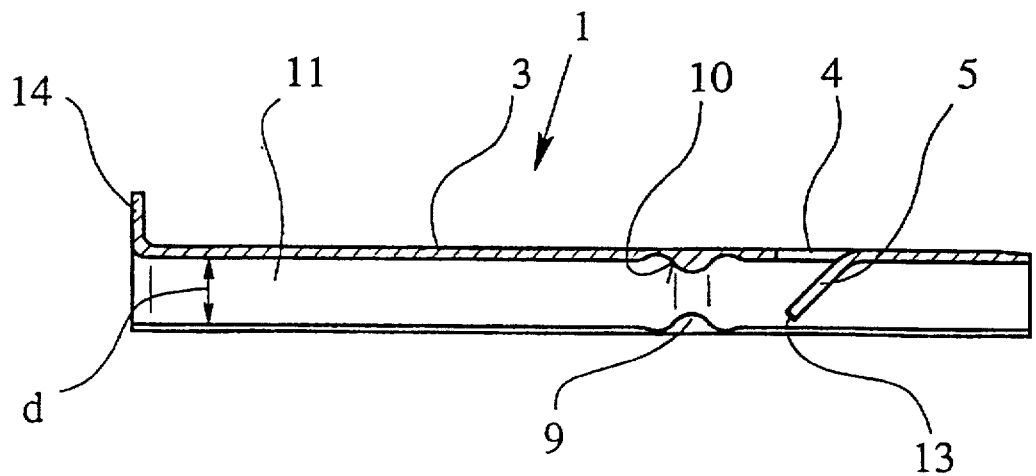
FIG. 3 is a cross-sectional view of the sleeve according to the invention.
Figure 4:
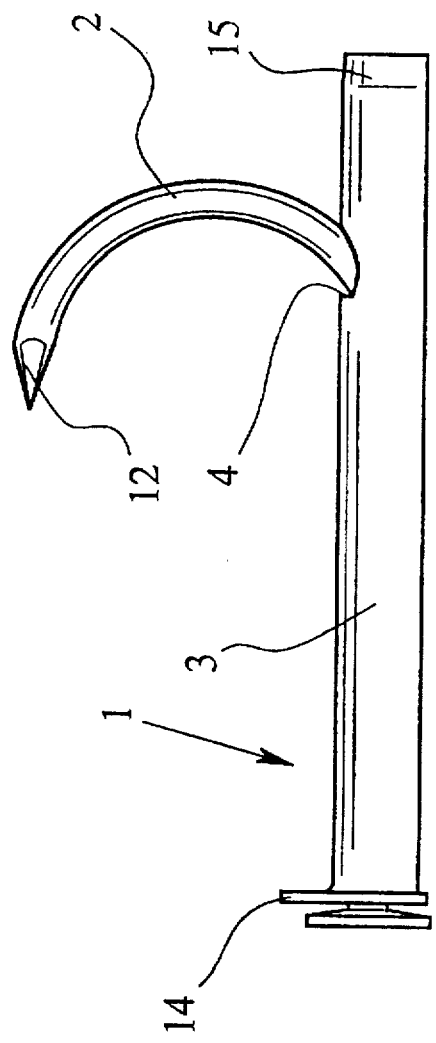
FIG. 4 shows a view of a sleeve according to the invention with a driven nail.

FIGS. 1 through 5 show a sleeve 1 for guiding, deflecting and holding a nail 2. Sleeve 1 has a sleeve body 3 which can have an essentially cylindrical shape. However, this need not necessarily be the case, as will be explained below. In sleeve body 3, there is a deflection opening 4. Furthermore, sleeve 1 has a guide 5 which extends from the interior of sleeve body 3 into the deflection opening 4 and is used to route the nail 2 out of the sleeve body 3 as it is being driven, and in doing so bends it.

It is significant, at this point, that the entire sleeve 1 be formed of a section of a flat material (not shown) which has been rolled. The flat material is, preferably, a rolled strip of the sheet-metal material "C 67 soft" having a thickness of 1.1 mm. This rolled material is much preferable to the tubular base material which was used to produce known sleeves.

Sleeve body 3 is rolled to form a slotted liner, slot 6 running in the longitudinal direction L of the sleeve body 3 of sleeve 1. In the embodiment shown in FIG. 2, the longitudinal edges 7, 8 of the sleeve body 3 are spaced apart from one another by a small distance. To increase inside diameter d of sleeve body 3, the distance between the longitudinal edges 7, 8 of the sleeve body 3 can be increased. To reduce the inside diameter d, the longitudinal edges 7, 8 can be made to abut one another or to overlap, in which case the sleeve body would now have only a generally cylindrical shape.

In sleeve body 3, in front of guide 5 in the insertion or driving direction of nail 2, a peripheral constriction 9 is provided. Constriction 9 has a feed bevel (radially and axially inward slope) 10 in the insertion direction of nail 2. The constriction reduces the inside diameter d of the insertion opening 11 in sleeve body 3. The feed bevel 10 prevents the nail tip 12 from unintentionally catching on the constriction 9 when the nail 2 is driven.

In this embodiment, guide 5 is a tongue-shaped tab which is pressed inwardly into the insertion opening 11 of the sleeve body 3, with deflection opening 4 being formed at the same time. The tongue-shaped tab is securely joined on one end to the sleeve body 3, while the, opposite, free end of thereof projects at its front edge 13 into the insertion opening 11 of the sleeve body 3 opposite the nail insertion direction. The height of the constriction 9 is chosen such that nail tip 12, when inserted and driven, does not strike the free edge 13 of the guide 5, which in the worst case could lead to its being pressed in the direction toward deflection opening 4, as a result of which the nail 2 could not be pressed entirely through sleeve body 3, and then, would not be bent. By suitable choice of the height of constriction 9, such a malfunction can be reliably avoided. The same can, of course, be achieved without constriction 9 by the tongue being pressed far enough into sleeve body 3 or insertion opening 11, i.e., sufficiently more than half the diameter d to extend past the tip of an inserted nail, as is the case for the degree of inward deflection shown in FIG. 5.

On the outer end of the sleeve body 3, i.e., the side to to be impacted to drive the sleeve body into a wall, an end edge of the sleeve is formed into a flanged head 14. On its opposite, inner end, the end of sleeve body 3 is formed with a chamfer 15. It is characteristic of inventive sleeve 1 that the head 14 is fully circumferential, but rather extends only over a partial area of the periphery of the sleeve body 3 (see, FIG. 2). This derives from the manner of production of sleeve 1 in the rolling process. The partially peripheral flanged head 14, however, is enough to reliably perform its function or task, i.e., preventing sleeve 1 from being pushed too deeply into the drill hole.

Figure 5:
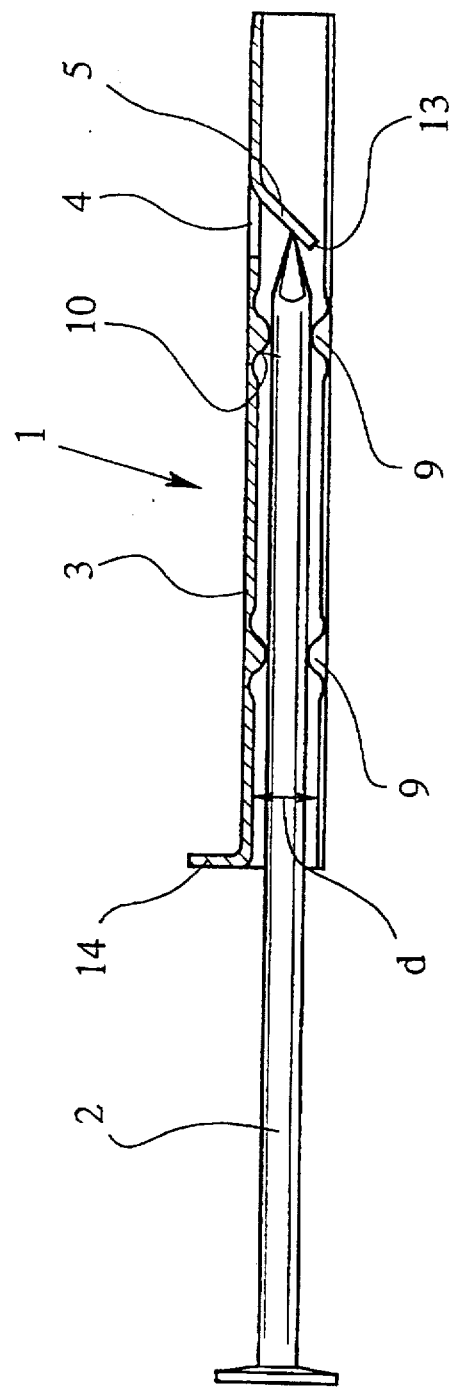
FIG. 5 shows a view of another embodiment of a sleeve according to the invention with a pre-mounted nail.

FIG. 5 shows another embodiment of sleeve 1. Sleeve 1 shown in FIG. 5 differs from the one shown in FIG. 3 by the fact that, in addition to the constriction 9 which is positioned relatively near guide 5, there is a second constriction 9' which is spaced well away from it toward the end of the sleeve 1 into which nail 2 is inserted. The provision of a pair of constrictions 9,9' which are spaced apart in the longitudinal direction L provides for accurate guidance of the nail 2 in sleeve 1.

The two constrictions 9,9' are matched to the diameter of the nail 2 such that at least one of the constrictions 9,9' exerts a slight clamping action on nail 2. Structurally this is done by inside diameter in the area of the constrictions 9,9' being smaller than the outside diameter of nail 2. The embodiment shown in FIG. 5 is advantageously formed as a pre-mounted structural unit of the sleeve 1 and nail 2 with the constrictions 9,9' being easily matched by the manufacturer to the nail to achieve a clamping action.

Sleeve 1 according to the invention is now produced as follows:

First of all, a section of flat material, for example, of sheet metal, is required. It is cut, for example, from flat material which is unwound from a coil. The flat material section then has the form of a rectangle. Before rolling the flat material section into a slotted sleeve 1 or liner, peripheral constriction (s) 9 (or 9,9') is (are) rolled into the inside or they are made as impressions which are, for example, pressed in. Thereafter, the section of flat material is rolled into sleeve 1. Then, the edge is rolled to produce flanged head 14 and to produce the chamfered sleeve end 15. Optionally, then, the longitudinal edges 7, 8 can be subjected to a slight grinding, if necessary. Finally, guide 5 is produced by punching out the tongue-shaped tab 13 and pressing it into insertion opening 11; however, the tongue shape of tab 13 can be pre-cut into the material of the sleeve while it is in its flat condition and merely pressed in to form the guide 5 after the material has been rolled to form the sleeve body 3.

We claim:

1. A nail and a sleeve for guiding, deflecting and holding the nail comprising a sleeve body, a deflection opening in the sleeve body and a guide which extends from within the sleeve body to the deflection opening; wherein the sleeve body is formed of a rolled section of a flat material; wherein at least one circumferential constriction is provided on an inner surface of the sleeve body, and wherein the constriction has an inner diameter which is less than an outer diameter of the nail for exerting a slight clamping pressure thereon.

2. Sleeve according to claim 1, wherein the sleeve body is formed of a rolled sheet-metal strip.

3. Sleeve according to claim 1, wherein the sleeve body is rolled of a rectangular section of flat material with longitudinal edges of the sleeve body abutting one another.

4. Sleeve according to claim 1, wherein the sleeve body is rolled of a rectangular section of flat material with longitudinal edges of the sleeve body being spaced apart from one another.

5. Sleeve according to claim 1, wherein the guide comprises a tongue-shaped tab which has been pressed inwardly from the sheet material to within the sleeve body resulting in the formation of the deflection opening.

6. Sleeve according to claim 5, wherein the sleeve is provided with a flanged head at one end and is chamfered at an opposite end.

7. Sleeve according to claim 6, wherein the flange head and the chamfered end are rolled portions of the sleeve.

8. Sleeve according to claim 1, wherein the constriction has a radially and axially inward slope in a direction of insertion of the nail into the sleeve, and wherein the constriction has a height which prevents a tip of the nail from striking an inner free edge of the guide during driving of the nail into the sleeve.

9. Sleeve according to claim 1, wherein said constriction is one of a pair of constrictions that are spaced apart from one another in a longitudinal direction of the sleeve.

10. Sleeve according to claim 9, in which a nail is held within said sleeve to form a pre-mounted unit.

11. Process for producing a sleeve for guiding, deflecting and holding a nail having a sleeve body, a deflection opening, in the sleeve body and a guide which extends from within the sleeve body to the deflection opening sleeve body comprising the step of rolling a section of flat material to form said sleeve body; wherein a constriction is rolled into the flat material section before rolling of the section of flat material to form the sleeve body.

12. Process according to claim 11, further comprising the steps of providing a coil of flat material, unwinding a section of the coiled flat material and cutting off a section of the flat material unwound from the coil and using the cutoff section in said step of rolling the section of flat material to form said sleeve body.

13. Process according to claim 11, further comprising the step of forming a flanged head on one end of the sleeve body and a chamfered an opposite end of the sleeve body by rolling of the sleeve body.

14. Process according to claim 11, wherein the guide is made as a tongue and after rolling of the flat material to form the sleeve body is pressed inwardly to within the sleeve body, simultaneously forming the deflection opening.

15. Process for producing a sleeve for guiding, deflecting and holding a nail having a sleeve body, a deflection opening in the sleeve body and a guide which extends from within the sleeve body to the deflection opening sleeve body comprising the step of rolling a section of flat material to form said sleeve body; wherein a constriction is rolled into the flat material section during rolling of the section of flat material to form the sleeve body.

16. Process according to claim 15, further comprising the step of forming a flanged head on one end of the sleeve body and a chamfered an opposite end of the sleeve body by rolling of the sleeve body.

17. Process according to claim 15, wherein the guide is made as a tongue and after rolling of the flat material to form the sleeve body is pressed inwardly to within the sleeve body, simultaneously forming the deflection opening.

18. Process according to claim 15, further comprising the steps of providing a coil of flat material, unwinding a section of the coiled flat material and cutting off a section of the flat material unwound from the coil and using the cutoff section in said step of rolling the section of flat material to form said sleeve body.

* * * * *